Aug. 4, 1964  G. J. CARLSON ETAL  3,143,302
CONDUIT WITH CLEAN-OUT DEVICE
Filed June 7, 1961

INVENTORS:
GEORGE J. CARLSON
FRANK A. CLELAND
WALTER DONG
BY: *Oswald H. Milmore*
THEIR ATTORNEY

United States Patent Office 3,143,302
Patented Aug. 4, 1964

3,143,302
CONDUIT WITH CLEAN-OUT DEVICE
George J. Carlson, Berkeley, Frank A. Cleland, Oakland, and Walter Dong, San Francisco, Calif., assignors to Shell Oil Company, New York, N.Y., a corporation of Delaware
Filed June 7, 1961, Ser. No. 115,366
9 Claims. (Cl. 241—46)

The invention relates to a conduit for the flow of liquid which contains matter subject to deposition in solid or gummy form, such as the effluent from a reactor wherein the reaction product is principally liquid but contains constituents which tend to accumulate on the conduit wall to form deposits; it is further concerned with a conduit suitable for feeding such a material to a device for disintegrating solid material carried by the liquid.

The invention is particularly but not exclusively applicable to effluent conduits from reactors wherein olefins, such as mono-olefins and di-olefins, are polymerized and a small amount of the gel of a synthetic elastomer is formed. It will be described by way of example as applied to the polymerization of butadiene in a solvent, such as a solution of butene-1 and benzene by means of a liquid cobalt chloride-ethyl aluminum sesquichloride catalyst, wherein the polymer is principally cis-1,4-polybutadiene dissolved in the solvent, but a small amount of an insoluble, cross-linked polymer is formed. The latter is in a form of a gel which adheres tenaciously to walls, especially to stationary or slowly moving surfaces, to form deposits which accumulate progressively and are insoluble in the polymer solution. When this gel fouls the reactor and/or the discharge lines or a disintegrator connected thereto the reactor must be shut down for cleaning. Prior to this invention such fouling occurred within a few days or weeks after the start of a run.

The reactor may contain means for limiting the accumulation of such deposits within the reactor, and for discharging loosened deposits therefrom entrained in the discharge stream; these are not parts of the instant invention. The discharge stream from the reactor is, according to the invention of the instant application, passed through a conduit which may be connected to a disintegrator or chopper wherein the entrained material is comminuted to permit dispersion throughout the principal polymer for inclusion therein or as a preliminary step to separation by filtration. It is further concerned with means for maintaining the said conduit free from deposits, and for adding an inhibitor such as a rubber-stabilizer to the effluent for preventing further deposits from forming in parts of the conduit and in all downstream piping and equipment, such as the cutting elements of a disintegrator.

It is an object of this invention to provide a duct for the flow of liquid containing adherent constituent, such as the effluent from the aforesaid reactor, wherein the duct can be maintained in operating condition and free from deposits which would foul it.

A further object is to provide a duct as specified having weir means, such as a valve therein, wherein the passageway through the weir section, specifically the valve, is also maintained free of deposits.

Another object is to provide means for flowing such a liquid, containing adherent solid material, to a disintegrator for comminuting said material.

Still another object is to provide a duct according to any of the foregoing objects having means for injecting an inhibitor, such as a rubber stabilizer, into the liquid for rendering said constituents and/or the solids carried thereby non-adherent, while preventing the back/flow of the stabilizer into the source of the liquid, e.g., into the reactor.

Still additional objects will become apparent from the following description.

In summary, the duct has an intake end, is closed at the other end, has a lateral discharge pipe branching from an intermediate part of the duct, and contains a scraper which can be moved along the length of the duct to remove deposits therefrom, said scraper being normally retracted in a terminal chamber situated between the lateral discharge pipe and the closed end of the duct. The scraper preferably has a passage therethrough so as not to act as a piston and is provided with an actuating rod which extends slidably through the closed end of the duct; a motor, such as a pneumatic piston, is preferably provided to reciprocate the rod.

The lateral discharge pipe is, in the embodiment to be described, connected to a disintegrator having cutting blades for comminuted solid material scraped from the duct or introduced into the duct from the source and carried by the liquid.

According to a feature of the invention the duct has means for forming a retractable overflow weir which, in the retracted position thereof, provides a passageway conforming to the internal size and shape of the duct to permit the scraper to pass through the passage at the weir location and maintain the passage clear of deposits. Further, to prevent inadvertent operation of the scraper when the weir is not fully retracted, an interlock is provided between the weir and the control for the motor which actuates the scraper. According to a preferred embodiment the weir means is a valve, such as a ball valve.

The invention further provides means for injecting an inhibitor into the liquid which will check the polymerization reaction to prevent further formation of adherent deposits and/or which will make the solids carried by the liquid non-adherent and thereby permit the solids to be transported through downstream conduits, if desired through a disintegrator, without fouling the flow passages or causing seizure between relatively moving structures. This means includes an inhibitor inlet leading into the said terminal chamber for flow therefrom into the principal part of the duct through the passage in the scraper. According to a further feature, the aforesaid weir is a valve of the type that has an upwardly slidable or a rotatable element over which the liquid flows. The inhibitor is thereby prevented from flowing upstream through the duct beyond the valve when the duct is only partly filled. This is important in many instances, for example, when the source of the liquid is a reactor wherein the polymerization reaction would be stopped if the inhibitor were to enter.

The invention will be further described with reference to the accompanying drawings forming a part of this specification and showing one preferred embodiment by way of illustration, wherein.

Figure 1:
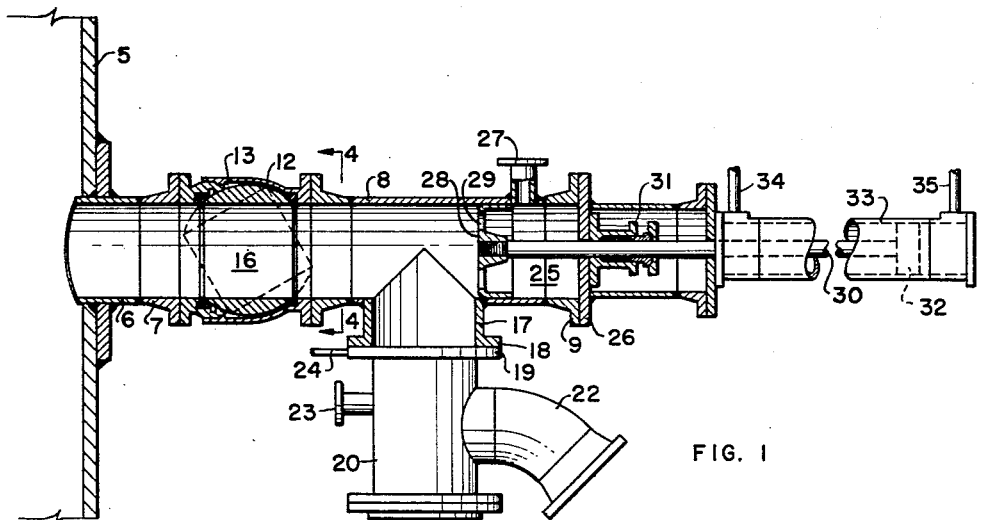
FIGURE 1 is a longitudinal sectional view through the duct, parts appearing in elevation.

Referring to the drawings in detail, 5 is the cylindrical wall of a vessel, e.g., a chemical reactor wherein butadiene is polymerized, having a horizontal overflow outlet conduit 6 fitted thereto at an upper level. The conduit may extend into the vessel to cause the conduit edge at the intake end to be spaced from the vessel wall and lie in a plane which is perpendicular to the conduit axis. The conduit may be formed of several sections 6, 7, 8, 9 joined end-to-end but has a uniform cross section and, preferably, a uniform curvature throughout; for example, the conduit may be circular in cross section and have zero curvature, as shown. The reactor may have a blade 10 which is moved to sweep the reactor wall for limiting the accumulation of deposits thereon. When the conduit extends into the vessel it is desirable to provide a ramp 11 to prevent the blade from catching on the projecting end of the conduit. A valve 12 is interposed between the sections 7 and 8, being in the illustrative embodiment a ball valve containing a ball 13 mounted for rotation on a horizontal axis by means of a valve stem 14 which carries a handle 15. The valve ball has a cylindrical passage 16 conforming to the internal diameter of the conduit.

A branch outlet pipe 17 is attached to the conduit section 8 and ends in a flange 18 to which is bolted the end flange 19 of a disintegrator 20. The latter, which functions as a gel cutter, contains cutting blades driven by a motor 21 and has a discharge pipe 22. Because disintegrators are known per se no further description is made herein. An inhibitor fluid may be introduced directly to the cutter parts by a nozzle 23 and further through a tube 24 connected to a bore in the flange 19. These features are not parts of this invention.

The part of the conduit section 8 beyond the pipe 17 forms a terminal chamber 25 which is closed by a closure plate 26. An inhibitor inlet 27 communicates with the chamber 25. The chamber contains a scraper 28 which is peripherally in engagement with the conduit 6, has axial passages 29 extending therethrough, and is secured to the end of an actuating rod 30 which extends slidably through the plate 26. A seal 31 prevents the loss of liquid about the rod. The rod is connected to a piston 32 mounted within a pneumatic cylinder 33 to the ends of which air under pressure is admitted selectively via tubing 34 and 35 under control of any suitable controller, such as that illustrated in FIGURES 3 and 4.

Figure 4:
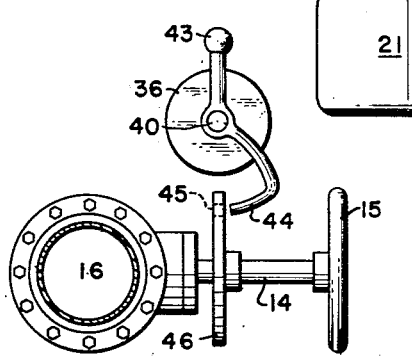
FIGURE 4 is a transverse sectional view, taken on the line 4—4 of FIGURE 1, on a reduced scale, showing the interlock.
Figure 3:
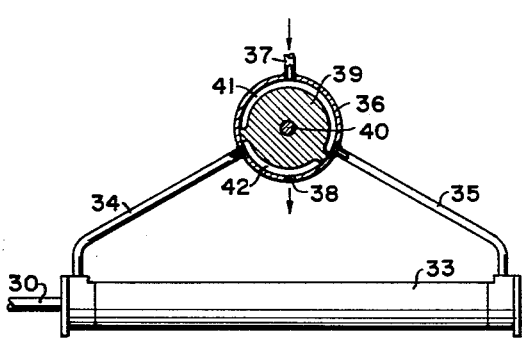
FIGURE 3 is a sectional view through a control valve for the pneumatic actuating cylinder.

Referring to FIGURES 3 and 4, the control valve includes a cylindrical housing 36 communicating with the tubings 34 and 35 through circumferentially displaced radial ports and having further a port connected to tubing 37 by which air under pressure is supplied from a source, not shown, and vent port 38 open to the atmosphere. The housing contains a rotary valve 39 mounted on a shaft 40 and having recesses 41 and 42, positioned so that either of the tubings 34 and 35 may be connected to the pressure tubing 37 while the other is vented to the atmosphere via the port 38. The shaft 40 is fixed to an operating handle 43. Any suitable interlock mechanism may be provided. For example, the handle 43 may have a pin 44 positioned to enter a hole 45 in a disc 46 which is fast on the valve shaft 14. The disc is oriented to be in alignment with the pin 44 only when the valve ball 13 is positioned to align its bore 16 with the ducts. The pin further prevents rotation of the valve from its fully open position until the shaft 40 and valve 39 are returned to the position shown, in which air is admitted to the tubing 34 to retract the scraper.

In operation, the reacted liquid, e.g., a solution of polymer of butadiene in the hydrocarbon solvent usually containing entrained adherent solids, such as gel, overflows from the reactor vessel into the conduit 6. The valve ball 13 is positioned as indicated in dotted lines to form an overflow weir. The duct usually is operated only partly full, and the liquid overflows the valve and flows thence into the branch pipe 17 and disintegrator or gel cutter 20. An inhibitor, such as a rubber stabilizer or a dilute solution thereof in a hydrocarbon solvent or in recirculated polymer solution, is injected through the inlet 27 and/or through the tube 24 to check the polymerization reaction and thereby prevent the formation of additional surface-adherent material such as gel. The inhibitor is also effective to render the solid gel carried by the liquid non-adherent. When inhibitor is not injected there is a tendency for the gel to foul the downstream pipes and the disintegrator blades and other running parts. The admission of at least some inhibitor through the inlet 27 is desirable to prevent fouling of the unscraped lateral discharge pipe 17 and to prevent the gel from accumulating between the conduit wall and scraper when the latter is not in use, which would render the latter immovable and normally this is used as the principal inlet. This inhibitor flows out through the passages 29 and becomes dissolved in the process liquid within the other parts of the conduit, principally up to the branch conduit 17.

Figure 2:
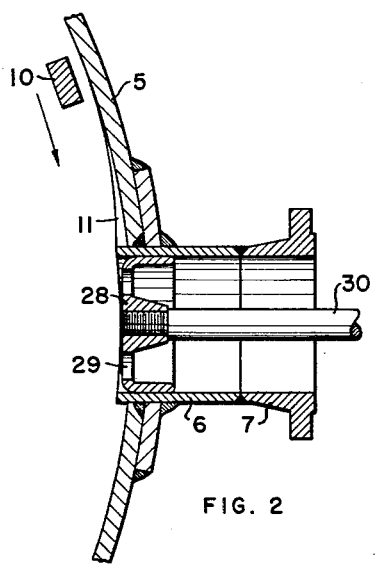
FIGURE 2 is an enlarged section view of the intake end of the duct showing its connection to a reactor vessel.

The weir formed by the valve ball 13 prevents influx of the inhibitor into the conduit section 6 and thence into the reactor, wherein it would stop the polymerization reaction. This influx could otherwise arise from turbulence or surges. Because no inhibitor reaches these parts there is a pronounced build-up of gel on the walls of the conduit section 6 and valve ball 13 and, to a lesser extent, downstream thereof to the branch pipe 17. This deposit is periodically removed by moving the valve to its fully open position (optionally after shutting off the flow of inhibitor through the inlet 27 and if desired, accompanied by a temporary increase of flow through the nozzle 23 and/or tube 24) and moving the handle 41 to admit high pressure air to the right of the piston 32 and cause the scraper to make a stroke to the end of the conduit, as shown in FIGURE 2. It is desirable that this stroke be of sufficient length to sweep the entire length of the conduit and best results are attained when the edge of the conduit at its inlet end is smooth and terminates in the plane swept by the blade 10, e.g., perpendicular to the conduit axis. At the end of the stroke the face of the scraper is in the plane of the conduit end. During this stroke liquid within the tube flows through the passages 29, so that the scraper does not push large amounts of liquid out of the duct. Accumulated gel is pushed into the reactor vessel and gel on the end of the scraper is removed by the blade 10, which moves over the ramp 11 and then sweeps the end of the scraper. The handle is then returned to the position shown to retract the scraper and the valve ball 13 is again moved to the solid-line position; admission of stabilizer, if suspended, is resumed. The gel which was pushed into the reactor is thereafter entrained by the liquid and carried through the conduit and pipe 17 into the disintegrator.

The stabilizers that may be used as inhibitor in the case of polymerization of mono-olefins or di-olefins wherein there is formed the solid or gel form of a synthetic elastomer includes members of the known class of rubber stabilizers of which there are numerous members. Rubber stabilizers are often called inhibitors and among the representative members may be mentioned para-butyl naphthyl amine, diphenyl-p-phenylenediamine, alkylated phenols (as 2,6-di-tertiary-butyl-4-methyl phenol), bis-phenols and the like.

We claim as our invention:

1. A duct for the flow of liquid which contains constituents that are adherent to walls, said duct comprising: a substantially horizontal conduit of uniform cross section having an open inlet end; a lateral discharge pipe communicating with the conduit at an intermediate part thereof to provide a terminal chamber in the conduit beyond the lateral pipe; movable means forming an overflow weir which extends upwards from the conduit floor at a location between said inlet end and said lateral discharge pipe; a scraper in peripheral engagement with the wall of the conduit of size to be contained within said terminal chamber, means for reciprocating said scraper through said conduit between said terminal chamber and said inlet end, said weir means being movable to a retracted position permitting passage of the scraper past said weir location; and means for admitting to the duct at a point downstream from said weir means an inhibitor which renders said constituents non-adherent.

2. A duct for the flow of liquid which contains constituents that are adherent to walls, said duct comprising:

a substantially horizontal conduit of uniform cross section having an open inlet end; a lateral discharge pipe communicating with the conduit at an intermediate part thereof to provide a terminal chamber in the conduit beyond the lateral pipe; movable means forming an overflow weir which extends upwards from the conduit floor at a location between said inlet end and said lateral discharge pipe; a scraper in peripheral engagement with the wall of the conduit of size to be contained within said terminal chamber, means for reciprocating said scraper through said conduit between said terminal chamber and said inlet end, said weir means being movable to a retracted position permitting passage of the scraper past said weir location; and interlock means for enabling operation of the scraper only when said weir means is in retracted position and preventing operation of the scraper in other positions of the weir means.

3. A duct for the flow of liquid which contains constituents that are adherent to walls, said duct comprising: a substantially horizontal conduit of uniform cross section having an open inlet end; a lateral discharge pipe communicating with the conduit at an intermediate part thereof to provide a terminal chamber in the conduit beyond the lateral pipe; movable means forming an overflow weir which extends upwards from the conduit floor at a location between said inlet end and said lateral discharge pipe; a scraper in peripheral engagement with the wall of the conduit of size to be contained within said terminal chamber, means for reciprocating said scraper through said conduit between said terminal chamber and said inlet end, said weir means being movable to a retracted position permitting passage of the scraper past said weir location; and, connected to said lateral discharge pipe, a disintegrator having confining walls, an intake duct, and an outlet pipe.

4. A duct for the flow of liquid which contains constituents that are adherent to walls, said duct comprising: a conduit of uniform cross section and curvature having an inlet end and a closure at the other end; a lateral discharge pipe communicating with an intermediate part of the conduit to provide a terminal chamber in the conduit between the closure and the discharge pipe; a scraper situated within said terminal chamber having a peripheral part in engagement with the wall of the conduit and having a flow passage therethrough; an actuating rod on said scraper extending slidably through the said closure of the conduit; actuating means for moving said rod axially to move the scraper to the inlet end of the conduit and retracting it; and an inhibitor inlet communicating with said terminal chamber on the side of the scraper away from the conduit inlet end when the scraper is retracted within said terminal chamber for the flow of inhibitor fluid from the chamber through the said scraper passage.

5. A duct according to claim 4 wherein said duct includes movable weir means mounted between said inlet end and the lateral discharge pipe, said weir means providing, in one position thereof, a passageway in alignment with the conduit for the passage of the scraper and, in another position thereof, providing an overflow weir to prevent flow of said inhibitor to the inlet end of the conduit.

6. In combination with the duct as defined in claim 5, interlock means for enabling operation of said actuating means for moving the rod when said weir means is in said one position and preventing said operation in other positions of the weir means.

7. A duct according to claim 5 wherein said weir means is a valve which includes a valve element mounted for rotation within a housing on a substantially horizontal axis and said conduit extends horizontally, wherein said valve element, when moved to partly closed position, forms a weir for preventing the flow of inhibitor through the conduit toward the inlet end.

8. In combination with the duct as defined in claim 4, a disintegrator having confining walls, an intake duct connected to said lateral discharge pipe, and an outlet pipe.

9. In combination with a vessel supplying liquid which contains constituents that are adherent to walls, an outlet duct for said liquid which comprises: a conduit of uniform diameter connected to said vessel at an open inlet end; a lateral discharge pipe communicating with the conduit at an intermediate part thereof to provide a terminal chamber in the conduit beyond the lateral pipe; a scraper in peripheral engagement with the wall of the conduit of size to be contained within said terminal chamber, said scraper having an end face which is free from protuberances; means for reciprocating said scraper through said conduit between said terminal chamber and said inlet end; and movable wiper means within said vessel for wiping the end of said scraper when positioned at the inlet end of the conduit.

References Cited in the file of this patent
UNITED STATES PATENTS

| | | |
|---|---|---|
| 1,781,435 | Carper | Nov. 11, 1930 |
| 2,015,849 | Hardies | Oct. 1, 1935 |
| 2,020,241 | Dimmig | Nov. 5, 1935 |
| 2,165,587 | Sweeny | July 11, 1939 |
| 2,718,012 | Howe | Sept. 20, 1955 |